Nov. 1, 1966  R. JOHNSON  3,281,966
EDUCATIONAL DEVICES
Filed May 20, 1964
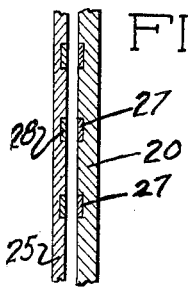
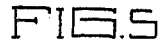
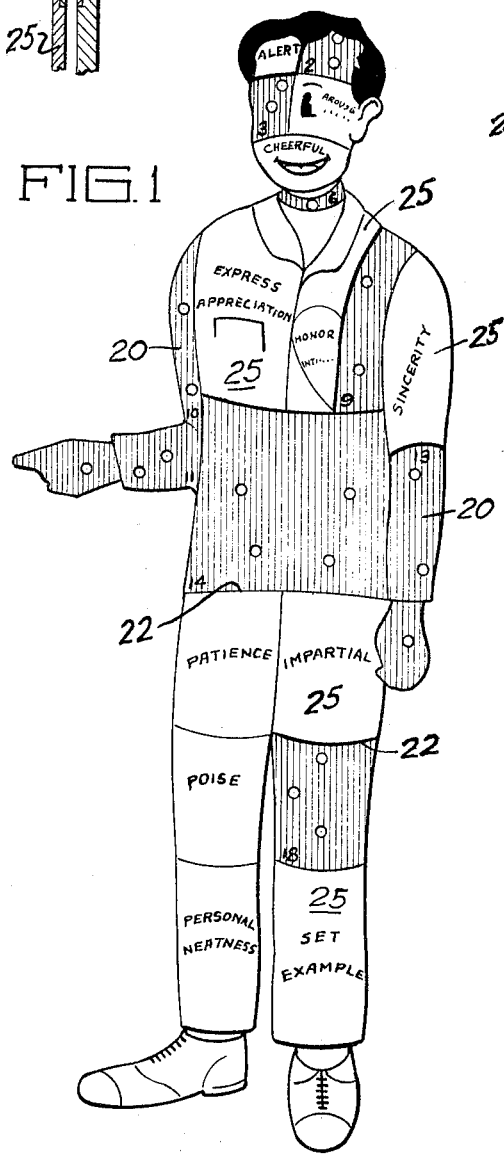
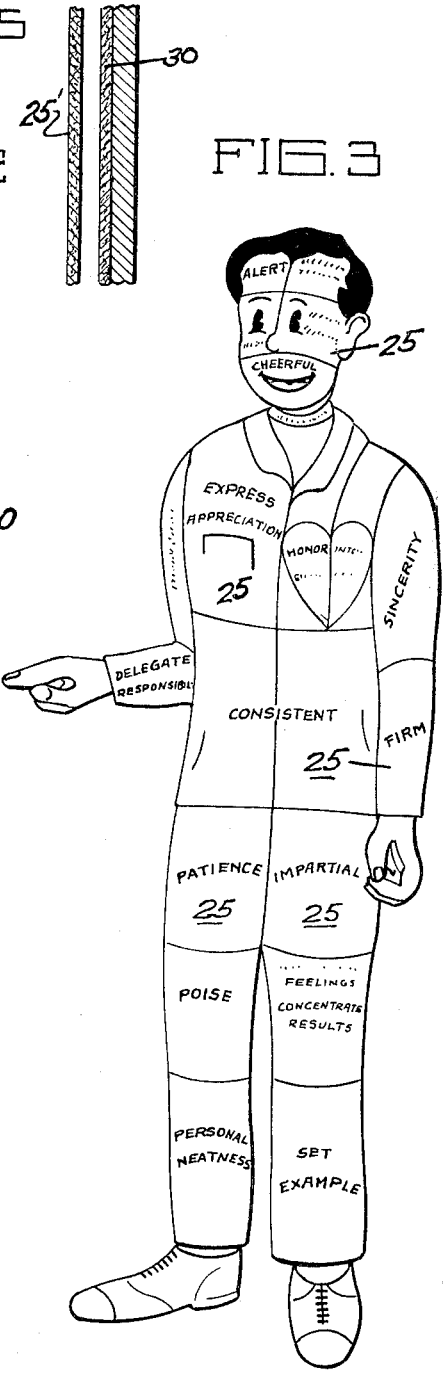
Inventor:
Richard Johnson
By: Eugene H. Simpson
Attorney.

United States Patent Office 3,281,966
Patented Nov. 1, 1966

3,281,966
EDUCATIONAL DEVICES
Richard Johnson, 5415 N. Diversey Blvd.,
Milwaukee, Wis.
Filed May 20, 1964, Ser. No. 368,908
2 Claims. (Cl. 35—21)

This invention relates to educational devices which will enable employers to evaluate the qualities possessed by their employees in such a way that the employees' attention will be focused on their own weaknesses and thus they will be inspired to strive to improve themselves.

In the conduct of a multi-unit operation such as gasoline service stations or other chain store operations, it is highly desirable to have all clerks and other personnel operate at their maximum efficiency. In order to keep the employees "on their toes" it is believed that progressive companies should instigate a regular program of testing all employees.

It is an object of this invention to provide an educational device which will show, graphically, the good and poor qualities of each employee subjected to a test or analysis.

Another object of the invention is to provide an educational device to impress upon an employee those areas in which he can strive to increase his efficiency.

A further object of the invention is to provide an educational aid which is readily portable and simple to operate.

Other objects will become apparent upon considering the following specification, which, when taken in conjunction with the accompanying drawings illustrates a preferred form of the invention.

In the drawings:

FIG. 1 is a front elevational view of the manikin with part of the cover pieces in place thereon;

FIG. 2 is a side elevational view of the manikin shown in FIG. 1, looking from the right;

FIG. 3 is a front elevational view of the manikin seen in FIGS 1 and 2, with all the cover pieces in place;

FIG. 4 is a vertical cross-sectional view through the manikin and cover plates showing the magnetic connecting members; and FIG. 5 is a modification of the invention showing a felt based manikin and felt cover plates.

The drawings show the invention as used to test an individual employed as a gasoline service station attendant and FIGS. 1–5 therefore depict a flat human figure or manikin. As an educational aid the manikin is used as a testing device to bring out the good and bad characteristics of an employee as related to his work.

Referring to the drawings, the manikin illustrated is in the form of a man and is divided into any required number of sections, 20, by lines 22 painted on the front surface thereof. Each of the sections 20 is assigned its own number, those shown being 2, 3, 6, 9, 10, 11, 13, 14 and 18, for purposes of ready identification. The numbers of the other sections of FIG. 1 are not shown since the sections are covered by cover plates 25, which conform in shape to the respective sections 20.

A plurality of cover plates 25, one plate corresponding in size and shape to each of the sections 2, 3, 6, etc., are provided, and depict the clothing worn by the manikin. On the outside of each cover plate 25 is written some characteristic which it is desired that the employee possess, such as being alert, cheerful, sincere, patient, neat, etc. Where practical, the characteristics are applied to the cover plates for those portions of the body that the public associates the particular characteristics, e.g., the heart section with honor, the mouth with cheerlfulness, etc.

Each section 20 of the manikin is provided with a plurality of two or more steel discs, 27, countersunk flush with the outer surface of the manikin. Similarly each of the cover plates 25 are provided with permanent magnets 28, countersunk flush with the inner surface of the cover plates at points corresponding with the location of plates 25, so that the magnets 28 will contact the steel discs 27 and hold the cover plates properly positioned on the manikin.

In the form of the invention shown in FIG. 5, the entire manikin is covered with a felt cover 30 and the cover plates 25' are also made of felt, so that the felt cover plates 25' adhere naturally to the felt on the manikin to complete the figure.

It is understood that if the employer desires to test employees for the efficiency of an entire store rather than individual efficiencies the manikin then used would be replaced and a blank outline form of the store with cover plates depicting various departments or features needing emphasis on care or improvement, for example, "attractive merchandise display," "keep floor clear of oil," etc.

Operation

In operation, a supervisor who is to give the test interviews an employee in a room in which the manikin 20, has been set up without any cover plates on it. The supervisor talks to the employee being tested telling him the qualities required to be an efficient and responsible employee. For example, if the employee seems wide awake—alert—the supervisor would tell him that he appeared alert and would place the cover plate marked "alert" on the upper left side of the manikin's head where the magnet 28 would hold it fixed to the manikin.

If the employee seldom smiled the supervisor would tell the man that being cheerful was important and that, under these circumstances he could not be given credit for being cheerful. Thus there would be no cover plate 25 placed on the portion of the head marked "cheerful" and the employee would be left with a graphic reminder that he was lacking in that quality, and he would be urged to improve himself in this respect.

The test would be continued until all the desired personal qualities the employee possesses, which are depicted on plates, have been determined and the identifying plates put in place on the manikin. Plates showing desired personal qualities which the examiner believes the employee lacks thus would be omitted from the manikin. The completed test would then show the manikin with all the desired qualities in place thereon with blank spaces for those qualities not possessed but desired. The completed test would therefore give a graphic illustration to the man being tested of his good qualities and would emphasize that he is lacking in some good qualities and must strive to improve himself.

When this method of testing is repeated at intervals it has been found that the employee has usually responded and corrected his deficiencies and thus become a more acceptable worker.

Having thus described the invention it is realized that it is susceptible to various changes and modifications and that such changes may be made as fall within the scope of the subjoined claims.

That which is claimed as new and is desired to be secured by United States Letters Patent is:

1. An educational device comprising, a flat base human manikin, visual means dividing said manikin into a plurality of sections, a plurality of separate cover plates conforming in size and configuration respectively to the sections of the manikin, each cover plate having written indicia indicative of separate and different characteristics of a human, certain plates exhibiting particular characteristics applied to sections of the manikin which represent those portions of a human being which conventionally have been associated with these characteristics, and means on the manikin and on the cover plates to releasably retain each cover plate on the manikin independently of each of the other cover plates.

2. A device in accordance with claim 1 in which the last named means includes magnetic members.

References Cited by the Examiner

UNITED STATES PATENTS

| | | | |
|---|---|---|---|
| 388,593 | 8/1888 | Smith | 35—17 |
| 1,480,458 | 1/1924 | Mershon | 35—8 |
| 1,926,139 | 9/1933 | Browne | 35—22 |
| 2,199,499 | 5/1940 | Kreitler | 35—42 |
| 2,853,803 | 9/1958 | Exton | 35—24 |
| 3,010,228 | 11/1961 | Torre | 35—73 |

EUGENE R. CAPOZIO, *Primary Examiner.*

H. S. SKOGQUIST, *Assistant Examiner.*